US012585996B2

(12) United States Patent
Kennel et al.

(10) Patent No.: US 12,585,996 B2
(45) Date of Patent: Mar. 24, 2026

(54) EXPLANATORY DROPOUT FOR MACHINE LEARNING MODELS

(71) Applicant: FAIR ISAAC CORPORATION, Roseville, MN (US)

(72) Inventors: Matthew Kennel, San Diego, CA (US); Scott Zoldi, San Diego, CA (US)

(73) Assignee: Fair Isaac Corporation, Minneapolis, MN (US)

( * ) Notice: Subject to any disclaimer, the term of this patent is extended or adjusted under 35 U.S.C. 154(b) by 625 days.

(21) Appl. No.: 17/972,510

(22) Filed: Oct. 24, 2022

(65) Prior Publication Data

US 2024/0135235 A1     Apr. 25, 2024
US 2024/0232683 A9     Jul. 11, 2024

(51) Int. Cl.
*G06N 20/00*     (2019.01)
*G06F 18/21*     (2023.01)

(52) U.S. Cl.
CPC ........... *G06N 20/00* (2019.01); *G06F 18/217* (2023.01)

(58) Field of Classification Search
CPC .............................. G06N 20/00; G06F 18/217
USPC .......................................................... 706/12
See application file for complete search history.

(56) References Cited

U.S. PATENT DOCUMENTS 11,042,551 B2     6/2021   Fahner et al.
2024/0062515 A1 *   2/2024   Oh ........................... G06N 3/04

OTHER PUBLICATIONS

Bussmann, et al., "Explainable machine learning in credit risk management", Computational economics (2021) 57:203-216 , 2021 (Year: 2021).*
Filipi et al., "Avoiding overfitting: a survey on regularization methods for convolutional neural networks", ACM Computing survey, vol. 54, No. 10s, Article 213, Sep. 2022 (Year: 2022).*
Schwab, P. et al. (2019). "CXPlain: Causal Explanations for Model Interpretation under Uncertainty." 33rd Conference on Neural Information Processing Systems (NEURIPS 2019), Oct. 27, 2019 (Oct. 27, 2019), Vancouver, Canada. 11 pages.

(Continued)

*Primary Examiner* — Tsu-Chang Lee
(74) *Attorney, Agent, or Firm* — Mintz, Levin, Cohn, Ferris, Glovsky and Popeo, P.C.; F. Jason Far-hadian, Esq.

(57)     ABSTRACT

Explanatory dropout systems and methods for improving a computer implemented machine learning model are provided using on-manifold/on-distribution evaluation of dropout of key features to explain model outputs. The machine learning model is trained using a plurality of input examples, including input records with explicit dropout operators applied effectuating the removal of influence of features associated with an explanation reason class. One or more dropout operators may be stochastically applied to one or more input examples. The procedure includes on-manifold/on-distribution evaluation of the machine learning model under conditions of absence or presence of the one or more dropout operators for reliable calculation of numerical statistics associated with reason classes to yield model explanations. The training and evaluation procedures present advantages over traditional off-manifold or off-distribution perturbative explanation procedures.

20 Claims, 4 Drawing Sheets

(56) References Cited

OTHER PUBLICATIONS

Yoon, J. et al. (Sep. 27, 2018). INVASE: "Instance-Wise Variable Selection Using Neural Networks." Published as a conference paper at ICLR 2019, pp. 1-24, Retrieved from the Internet: URL:https://web.archive.org/web/20190506085218if_/https://openreview.net/pdf?id=BJg roAcK7. [retrieved on Mar. 20, 2024].

Bracke, P. et al. (2019). "Machine learning explainability in finance: an application to default risk analysis." Bank of England Working Paper No. 816. 44 pages.

Burkart, N. et al. (2021). "A Survey on the Explainability of Supervised Machine Learning," J. Artif. Intell. Res., pp. 245-317.

Datta, A. et al. (2016). "Algorithmic Transparency via Quantitative Input Influence: Theory and Experiments with Learning Systems." 2016 IEEE Symposium on Security and Privacy (SP): 598-617.

Lundberg, S. et al. (2017). "A Unified Approach to Interpreting Model Predictions." in Proceedings of the 31st International Conference on Neural Information Processing Systems, Long Beach, California, USA, 2017. 10 pages.

Srivastava, N. et al. (2014). "Dropout: A Simple Way to Prevent Neural Networks from Overfitting." Journal of Machine Learning Research, vol. 15, pp. 1929-1958.

Yang, Z. et al. (2019). "Enhancing Explainability of Neural Networks Through Architecture Constraints." IEEE Transactions on Neural Networks and Learning Systems, 32, 2610-2621.

* cited by examiner

*FIG. 2*

EXPLANATORY DROPOUT FOR MACHINE LEARNING MODELS

TECHNICAL FIELD

The disclosed subject matter relates generally to the field of artificial intelligence (AI) and to technical improvements that promote the efficiency and explainability of complex machine learning models (ML Models).

BACKGROUND

Machine learning models are computational models that are capable of representing a predictive relationship between a set of input variables and value of one or more output labels or outcomes. Typically, training data that includes input variables and known outputs is provided to a machine learning model. Based on the input, values are assigned to free parameters so that the model can be used to predict the output label, or the predicted distribution.

Machine learning models demonstrate flexible predictive power across a large variety of domains. The functional form of a model may be designed based on the structure and learning ability of biological brains (i.e., neural networks), which is highly flexible as compared to classical parametric models. This flexibility can unlock a high non-linear predictive ability in a compact and efficient form. The enhanced predictability can advantageously enable high prediction accuracy compared to traditional statistical models.

Many machine learning models are highly complex and included a multi-layered network of nodes that is used to implement relationships between features that influence the models' output. Due to the opaque and complex nature of some features and relationships, these models are typically referred to as "black boxes" as the human mind, including the mind of the designers of the models, is often not capable of fully appreciating the underlying relationships and architecture.

Certain techniques have been utilized to provide some level of external human understanding for these complex models. However, most of these techniques involve methods that use approximations under assumptions which can be invalid. Further, most of these techniques are not suitable or comprehensive enough to meet current regulatory standards. For example, it may be important to ensure and demonstrate that the credit risk estimated using a predictive model complies with certain anti-discriminatory regulations.

Thus, machine learning models and the underlying neural networks need to be explainable in order to generate trust in regulators and customers that use the learning models. This can be accomplished by enabling a sufficient level of investigative inquiry in business and functional operations of the model before or after the results are produced. Specifically, it is desirable to quantify the influence of various inputs and the contribution of different model features, individually or collectively, on the generated results.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In accordance with one or more embodiments, explanatory dropout systems and methods for improving a computer implemented machine learning model are provided, where on-manifold/on-distribution evaluation of dropout of key features is used to explain model outputs. The machine learning model is trained using a plurality of input examples, including input records with explicit dropout operators applied effectuating the removal of influence of features associated with an explanation reason class.

In one implementation, a machine learning model is trained using a plurality of input examples provided to the machine learning model. One or more dropout operators are stochastically applied to one or more input examples. The training may be based on one or more conditions. The conditions may include the absence or presence of the one or more dropout operators as applied to the one or more input examples.

The application procedure in some aspects includes on-manifold/on-distribution evaluation of the machine learning model under conditions of absence or presence of the one or more dropout operators for reliable calculation of numerical statistics associated with reason classes to yield model explanations. The training and evaluation procedures present advantages over traditional off-manifold or off-distribution perturbative explanation procedures.

The machine learning model may be evaluated under the conditions of absence and presence of the one or more dropout operators as applied to the one or more input examples. Explanatory statistics for the machine learning model are determined, in certain embodiments, based on the output generated by the machine learning model under the noted conditions (e.g., based on the absence or presence of one or more dropout operators as applied to the one or more input examples).

In some instances, at least one or more dropout operators are associated with a set of inputs corresponding to a reason group, where the inputs have similar explanation reasons. The machine learning model is evaluated at scoring time on a first input vector to generate a score. One or more reason codes are generated along with the score to explain the score and provide an understanding of the machine learning model's use of elements of the input vector and their importance in producing the score. At least a first reason code from among the reason codes corresponds to at least a first reason group.

Depending on implementation, the first reason group may be associated with a computation using the machine learning model's output observed in various dropout and non-dropout conditions. The first reason group may be associated with a most influential explanatory statistic computed for the machine learning model based on the differences in the machine learning model's output between the dropout conditions, where the machine learning model has been trained on both dropout and non-dropout conditions.

The one or more dropout operators may be configured to perform an elementwise multiplicative function upon a first input vector. In one example embodiment, the one or more dropout operators are defined per reason group, an operator denoted by $D_k[\bullet]$, with k ranging over a set of reason groups, and $R_k$ denoting the set of input indices corresponding to reason group k:

$$D_k[x_j] = \begin{cases} \alpha_k \cdot x_j & \text{if } j \notin R_k \\ 0 & \text{if } j \in R_k \end{cases}$$

3

Value of $\alpha_k$ may be one of $\alpha_k=1$; or $\alpha_k=D/(D-|R_k|)$, with D overall number of input features and $|R_k|$ being the number of input features associated with reason group k; or $$\alpha_k = \frac{|R|}{|R|-1}$$

for all $\alpha_k$, with $|R|$ being the total number of reason groups; or $\alpha_k$ as a free parameter to be optimized in the machine learning training process. One or more dropout operators may be selected stochastically per example during training under a distribution. The selection may be based on different approaches as provided below.

In one approach, a certain fraction of input examples may be selected to be subject to dropout. For a selected example, one dropout operator may be chosen at random from a distribution which may or may not be uniform over the reason groups. In another approach, the selection may be based on whether to apply at least one of the dropout operators independently according to a binary probabilistic choice per operator, which may or may not be uniform across the reason groups. Probabilistic parameters, in certain instances, are chosen to ensure that there is a reasonable probability that no dropout operator will be applied to the given example. In another approach, a set of dropout operators is selected to apply (or not to apply) according to a Shapley sampling distribution.

In some embodiments, a unary explanatory dropout statistic is given by $\iota_k(x)-M[x]-M[D_k[x]]$, with M[x] denoting a machine learning model score upon input vector x, and $D_k[x]$ denoting a dropout operator dropping out inputs with reason group k, and wherein the machine learning model has been trained on both dropout and non-dropout conditions. A marginal explanatory dropout statistic is given by $\iota_{k,S}(x)=M[D_S[x]]-M[D_{k\cup S}[x]]$, with S denoting a set of dropout operators not including dropout operator k, and wherein the machine learning model has been trained on both dropout and non-dropout conditions. The notation $D_Z[x]$ may represent a composite dropout operator executing individual dropout operators contained in arbitrary set Z.

A unary explanatory dropout statistic may be given by $\iota_k(x)=M[x]-M[D_k[x]]$ and a marginal explanatory dropout statistic is given by $\iota_{k,S}(x)=M[D_S[x]]-M[D_{k\cup S}[x]]$. The unary dropout statistic may be used to form an explanatory result with the univariate attribution method. The unary explanatory dropout statistic and the marginal explanatory dropout statistic may be combined to form an explanatory result with the univariate, stepwise, K-tuple, Shapely, or KernelSHAP attribution methods, in accordance with one or more embodiments and depending on implementation.

Implementations of the current subject matter may include, without limitation, systems and methods consistent with the above methodology and processes, including one or more features and articles that comprise a tangibly embodied machine or computer-readable medium operable to cause one or more machines (e.g., computers, processors, etc.) to result in operations disclosed herein, by way of, for example, logic code or one or more computing programs that cause one or more processors to perform one or more of the disclosed operations or functionalities. The machines may exchange data, commands or other instructions via one or more connections, including but not limited to a connection over a network.

The details of one or more variations of the subject matter described herein are set forth in the accompanying drawings and the description below. Other features and advantages of the subject matter described herein will be apparent from the description and drawings, and from the claims. The disclosed subject matter is not, however, limited to any particular embodiment disclosed.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations as provided below.

FIG. 2 shows an example of the application of one or more dropout masks to groups of input features for generating a modified data vector which can be used to train a machine learning model.

The figures may not be to scale in absolute or comparative terms and are intended to be exemplary. The relative placement of features and elements may have been modified for the purpose of illustrative clarity. Where practical, the same or similar reference numbers denote the same or similar or equivalent structures, features, aspects, or elements, in accordance with one or more embodiments.

DETAILED DESCRIPTION OF EXAMPLE IMPLEMENTATIONS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Figure 1:
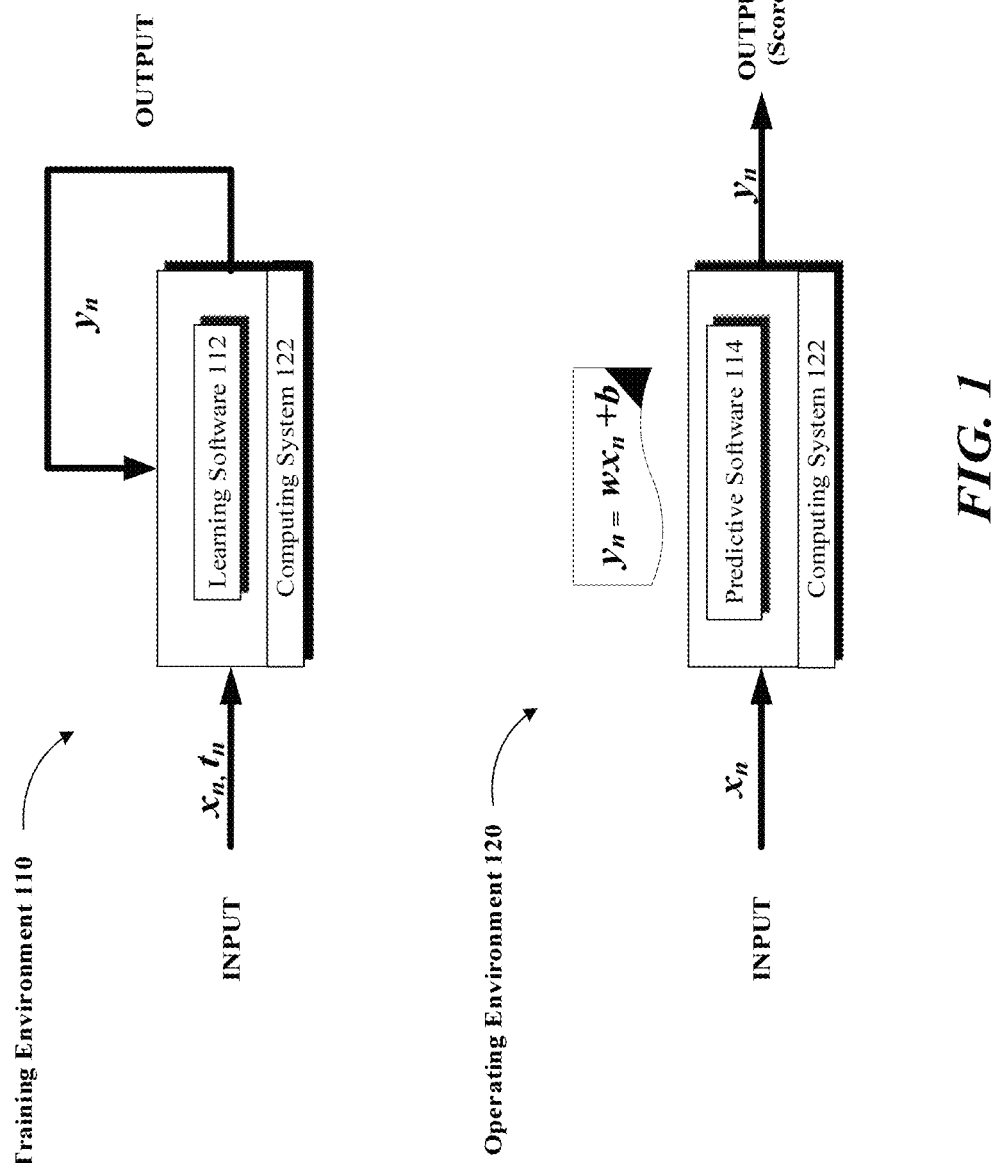
FIG. 1 illustrates example training and operating environments for a machine learning model, in accordance with one or more embodiments.

Referring to FIG. 1, example training environment 110 and operating environment 120 are illustrated. As shown, a computing system 122 and training data (e.g., input $X_n$, $t_n$) may be used to train learning software 112. Computing system 122 may be a general-purpose computer, for example, or any other suitable computing or processing platform. Learning software 112 may be a machine learning model or self-learning model that receives event-related input data. In the training phase, an input event may be known as belonging to a certain category (e.g., fraudulent or non-fraudulent) such that the corresponding input data may be tagged or labeled accordingly.

It is noteworthy that while certain example embodiments may be implemented in a direct classification (e.g., hard classification) environment, other possible embodiments may be directed to score-based classification in a probabilistic sense (e.g., soft classification) as well as regression. Accordingly, learning software 112 may process the input data associated with a target event without paying attention to the labels (i.e., blindly), and may categorize the target event according to an initial set of weights (w) and biases (b) associated with the input data. When the output is generated (i.e., when the event is classified by learning software 112), the result may be checked against the associated labels to determine how accurately learning software 112 is classifying the events.

In the initial stages of the learning phase, the categorization may be based on randomly assigned weights and biases, and therefore highly inaccurate. However, learning software 112 may be trained based on certain incentives or disincentives (e.g., a calculated loss function) to adjust the manner in which the provided input is classified. The adjustment may be implemented by way of adjusting weights and biases associated with the input data. Through multiple iterations and adjustments, the internal state of learning software 112 may be continually updated to a point where a satisfactory predictive state is reached (i.e., when learning software 112 starts to more accurately classify the inputted events at or beyond an acceptable threshold).

In the operating environment 120, predictive software 114 may be utilized to process event data provided as input. It is noteworthy that, in the operating phase, input data is unlabeled because the classification (e.g., the fraudulent nature) of events being processed is unknown to the model. Predictive software 114 may generate an output that classifies a target event as belonging to a first class (e.g., the fraudulent category) based on fitting the corresponding event data into the first class according to the training data received during the training phase. In accordance with some embodiments, predictive software 114 may be a trained version of learning software 112 and may be executed over computing system 122 or another suitable computing system or computing infrastructure to generate one or more outputs, classifications, or scores that can be used to make determinations or predictions.

In the context of the operational use of machine learning scores, it may be important to provide explanations about the machine learning model and the scores generated by the machine learning model. For example, reasons may need to be provided when the score is used to reject a customer's loan application. In fraud and cybersecurity applications, the score is usually used to accept or block transactions and the explanation algorithm provides guidance to analysts where to start their investigation of fraud. It is noteworthy that while example implementations provided here may refer to using computational modeling and machine learning to generate a score used for detecting fraud or apply to events involving financial transactions, such example implementations and details should not be construed as limiting the scope of the disclosed subject matter to the particular fields of use.

As noted earlier, many machine learning models suffer from relational complexities that are difficult for a human mind to understand or appreciate. To enhance explainability and to enforce certain desired model behavior according to mandatory constraints, in the following, novel systems and methods are provided for training a model so that the model can simultaneously perform well on a primary objective function and also perform stably with certain groups of input features removed from influence on the model's scoring. In certain implementations, perturbations are made to the model to quantitatively evaluate and rank the influence of groups of input features with the confidence that the model will perform sensibly and reliably on the perturbed input set.

One strategy for enhancing explainability of machine learning models is to restrict the complexity and computational class of the model such that the pieces of the model may be inspected post-hoc after training to provide explainability by inspection. For example, the model may be restricted to a linear combination of feature values, such as in linear or logistic regression, or a generalized additive model (GAM) where the additive terms may have simple nonlinear transformations such as binning (e.g., in credit risk scorecards) or learned smoothing functions. Illustrative examples of learning models with interpretability constraints reducing to additive contributions are known. With classical and generalized linear or additive models, the individual contributions are expected to be human-interpretable on their own by construction and the additive decomposition of these cognitively simple elements is taken to be the interpretable explanation of the score.

Some explanation algorithms are created to provide quantitative explanations by ranking or quantifying feature importance of more complex "black box" or "grey box" machine learning models. Such algorithms are typically general purpose and not tied to the specific mathematical structure of the predictive model. In certain implementations, the model's sensitivity to changes in inputs may be quantified by replacement of some input features with uninformative substitutes and measuring the effect on the output (e.g., a generated score). A model's sensitivity to change may be also measured based on significant finite-size perturbation, or numerical or analytical gradients with respect to input values, a microscopic perturbation.

The effect of macroscopic perturbation is generally considered to be more useful and informative for human understanding as compared to other methods that provide a gradient value which is intrinsically associated with a very local effect and may not be applicable outside a narrow region of input space. Challenges exist in local perturbative approach in useful interpretation, because a sensitivity measure indicates importance based on a small score change given a vector of variable values. A local perturbative approach, however, does not always reveal the reasons for the base score, but provides information about the perturbations around a known state. Moreover, perturbations in one input could imply correlative necessary movement in other features based on the perturbation but are not realistically engaged in the perturbative procedure.

An example of a typical macroscopic perturbative approach is the quantitative input influence (QII) method. The QII may be defined as the numerical difference between the model's score on an observed input vector minus the expectation of the score with one coordinate of the observed input marginalized out (i.e., integrated over the distribution of the observed input). The expectation is the primary value of interest and may be evaluated numerically using a random sample of observed data in that coordinate from the training distribution.

Assuming the observed input vector is $x=(x_1, x_2, x_3, \ldots, x_d)$, it may be desirable to measure the influence of input 1 under a model which gives a scalar score $M[x]$, the univariate QII may be calculated by: $QII(i)=M[x]-E_{x \sim Pr(X_1)}[M[x, x_2, x_3, \ldots x_d]]$ with the expectation being an integral over the probability distribution of the first coordinate of the input vector in the training set. In one implementation, the expectation value is replaced by an average over a finite sample of that coordinate drawn randomly from a subset of the input distribution K times, as represented by:

$$E_{x \sim Pr(X_1)}[M[x, x_2, x_3, \ldots x_d]] \approx \frac{1}{K} \sum_{x \in X_1} M[x, x_2, x_3, \ldots x_d]$$

The example above is trivially generalizable to consider any input and furthermore any subset of multiple inputs. As such, the empirical QII measurement has certain disadvantages. One flaw, shared by numerous model-agnostic explanatory algorithms including the specific QII statistic, is that the model is evaluated on an unnatural data distribution or data manifold, a condition that the model has not seen during the training process, unlike the conventional use of the score itself. For the above reasons, there is no guarantee that a learning model (e.g., a high complexity class such as an artificial neural network or a tree ensemble) will perform sensibly or usefully off the training data distribution, as the perturbations are intentionally significant.

Notably, the above computation of the expectation over the varying first coordinate may involve evaluating the machine learning model on an unrealistic input vector (e.g., given the reference of the other existing coordinates and the naturally observed data distribution), and is not a physically natural or probable input state, often referred to as "off-manifold" or "off-distribution" because the relationship of the perturbed coordinate to the other coordinates is not typically observed. With randomization-perturbed QII, the machine learning model is being evaluated on data vectors macroscopically different from the distribution on which the model had previously been trained, which is, in typical practice, the naturally observed data distribution. It is usual that various input features in the naturally observed data have significant co-correlation among each other, and the trained model relies on, and assumes, this property. Under these conditions, there is the potential that the output of the machine learning model for some unnaturally perturbed input vectors may show "wild" or uncontrolled values relating to the model parameters and peculiarities of the model training procedure (which does not usually constrain out of distribution behavior) which are unrelated to any sensible concept of explainability for the inputs which were observed. There is little guarantee that the explainability statistics derived from these model evaluations are also reliable.

Another disadvantage is that the computation is expensive, requiring K evaluations of the model for every coordinate, and K must be significant (e.g., 500) to get a fair level of accuracy. This computational effort is particularly burdensome if the explanatory algorithm is used to explain individual scoring decisions in a real-time setting.

A further disadvantage is that the randomization-based QII approach requires storing a significant amount of observed data to use when generating explanations which may be operationally cumbersome or out of compliance with privacy and data protection policies.

To overcome the above shortcomings, a model-agnostic explanation technique is provided which avoids evaluating the model off of the distribution on which it was trained, and addresses the influence of various combinations of features used or not used in a secondary model evaluation. Unlike the post-hoc perturbative QII concept, the provided technique poses, and answers, a set of logically clear counterfactual questions which address an intuitively appealing concept of explainability. A representative underlying counterfactual question at stake is to determine to what degree the score generated by the machine learning model changes, if the model were to avoid using any particular set of inputs. In an example embodiment, advantageously, evaluations of the model at operational scoring time, when explanations are needed, are performed on data distributions which were used during the model training phase. Therefore, one may expect the model outputs produced in these conditions are similarly reliable because the model training process adjusted parameters with an optimization algorithm to best approximate observed outcome data under explanatory counterfactual conditions as well as unperturbed baseline conditions. Another technical advantage is the computational efficiency of the method compared to techniques which require evaluation of ensembles to generate an explanation statistic at scoring and explanation phase. In practical use of machine learning models, computational resources may often be constrained in this phase.

In accordance with one or more embodiments, instead of using a QII approach, feature importance statistics (e.g., the features which touch the model) are replaced with a superior methodology as provided in further detail herein. Using this approach, the user may optionally follow on with similar second phase post-processing computations to generate an additive allocation but is not required to do so. A pragmatic interpretability for individual scores can be achieved with less computationally costly approaches than the expensive combinatorial combinations needed for the additive decompositions.

To achieve the above objectives, in accordance with one or more embodiments, a modified model training methodology is provided for a supervised machine learning model which uses specified input perturbations during the training process, so that input may also be used in a post-training process for score explanation while preventing a data distribution mismatch between training and post-training explanation generation. The set of inputs may be categorized ahead of time into reason groups, which are subsets of the inputs with similar explanation reasons. This may be done using human knowledge based on the specific construction and feature engineering of the inputs from raw data. For instance, multiple numerical features, which all measure aspects of a similar general phenomenon, may be grouped into a single reason group and assigned a specific reason code. This assignment may be performed prior to model training and does not change during model operation.

Feature attribution algorithms, as commonly described in the explainable machine learning literature, correspond to the simple assumption that a reason is identified with a single unique feature. Generalizing to the common practical situation encountered in business use of a machine learning algorithm, the numerical dimensionality of the input space and corresponding feature space is larger than the desired space of human-palatable explanations. Therefore, multiple input features may be clustered to a single reason group by expert knowledge of the construction of the features and the reason group may be used as the elementary unit of explanation.

At evaluation time, after the score is produced, the explanation algorithm provides a numerical statistic corresponding to each reason group. In common practice, these explanation statistics will be ranked and reason codes corresponding to the most explanatory reason groups will be provided along with the primary score itself. A specified perturbation may be used to train a machine learning model to predict the score and also to train the model to reliably address counterfactuals of removing groups of inputs corresponding to reason groups by training using structured perturbations of the inputs. These perturbations may be re-used at explanation generation time near-simultaneously with scoring in order to quantify the influence of groups of inputs without ever probing the machine learning model in an off-distribution/off-manifold condition.

In example implementations, inputs may be centered so that the mean or median in the training set is zero (e.g., zero represents a "neutral" or uninformative value). Inputs are also scaled to unit standard deviation. A structured dropout operator which is applied to the input vector is provided below. There is a dropout operator defined per reason group, denoted $D_k[\cdot]$, with k ranging over the set of reason groups:

$$D_k[x_j] = \begin{cases} \alpha_k \cdot x_j & \text{if } j \notin R_k \\ 0 & \text{if } j \in R_k \end{cases}$$

$R_k$ is the set of input indices corresponding to reason group k, which corresponds to the operation to drop out all inputs of reason group $R_k$. The constant $\alpha_k$ is greater than or equal to 1, and upweights the remainder of the inputs. Example choices for $\alpha_k$ are:

$\alpha_k = 1$ $\alpha_k = D/(D-|R_k|)$, with D the dimensionality of the input space (number of input features) and $|R_k|$ being the number of input features associated with a reason group k. This choice is closest to the original dropout idea.

$$\alpha_k = \frac{|R|}{|R|-1}$$

for all $\alpha_k$ with |R| being the total number of reason groups.

$\alpha_k$ is a free parameter to be optimized in the machine learning process.

At the training time of a machine learning model, dropout operators may be applied to some of the examples stochastically. A variable or process is stochastic if there is uncertainty or randomness involved in the outcomes. In other words, stochastic is a synonym for random and probabilistic, although is different from non-deterministic. Many machine learning algorithms are stochastic because they explicitly use randomness during optimization or learning.

For a batch learning algorithm, where all the training data is considered simultaneously, a data augmentation process may be used to replicate the input data and stochastically apply dropout operators to the replicated data. This allows the model to train also on groups of inputs for reason groups missing as part of the model training. For a stochastic learning algorithm, such as mini-batch stochastic gradient descent used to train artificial neural networks, it means stochastically applying one or more of the dropout operators to some, but not all, of the randomly selected training examples. A training example may appear and be used to train in both unmodified and dropout altered forms.

Figure 2:
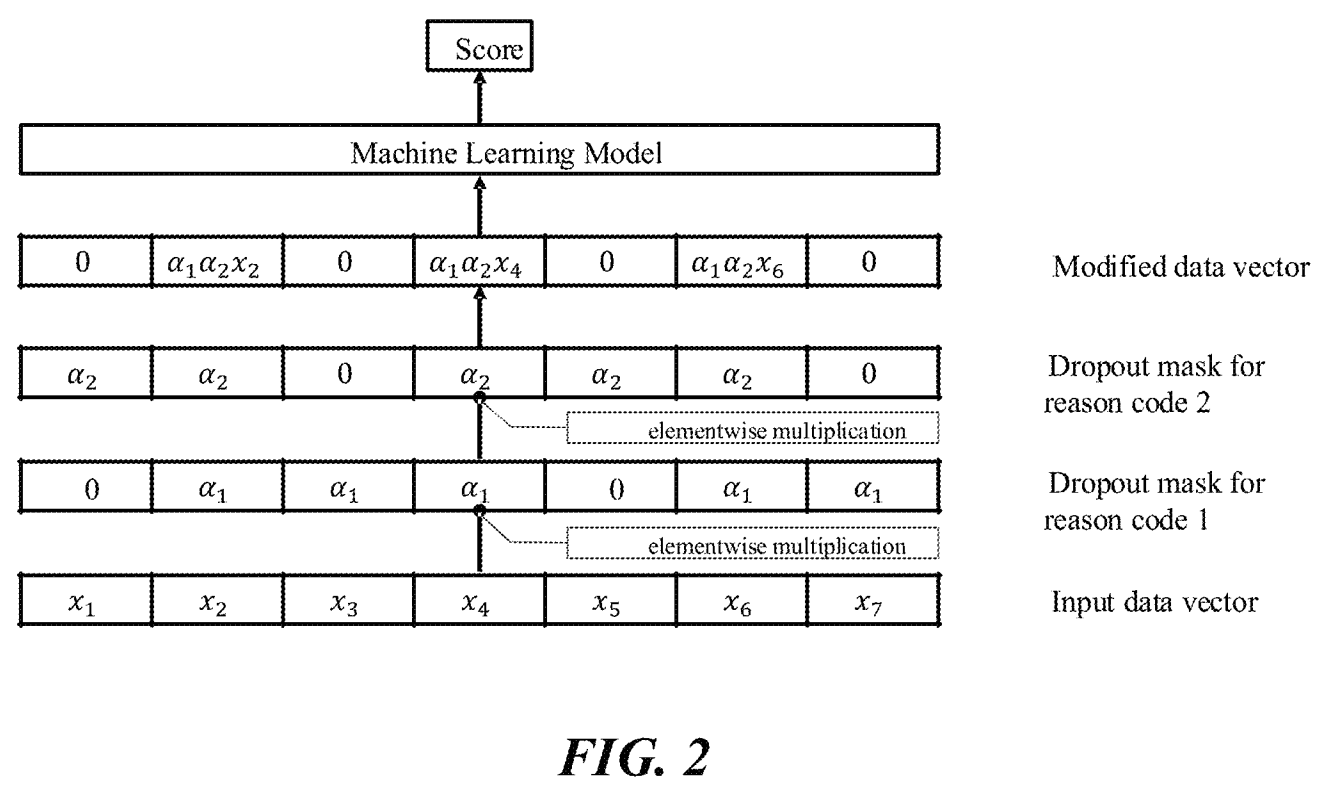

Referring to FIG. 2, in one or more embodiments, a machine learning model is trained using dropout masks applied to groups of input features (e.g., input data vectors). As shown, a first dropout mask may be applied in association with a first reason code and a second dropout mask may be applied in association with a second reason code by way of elementwise multiplication, for example. In this manner, a modified data vector is generated to train the model. The trained model supports an attractive counterfactual explanation that explains how the model would score if certain variables corresponding to identifiable reason groups cease to influence the score. The resultant perturbed model is more computationally efficient and justifiable than other model perturbation methods, such as those used in common implementation of Shapely Additive Explanations (SHAP), a common explanation decomposition technique.

In certain implementations, more than one dropout operator may be applied to a single example. In an embodiment with multiplicative masks, the order of operation is not important. Further, in certain aspects, not all examples used to train have a dropout operator applied because it is desirable for the machine learning model to learn its primary target (e.g., best prediction, using all inputs) as well as achieve reasonable performance with dropout applied.

There are numerous potential choices of the distribution of which, if any, dropout operators may be applied probabilistically to an example. The following are examples of potential choices:

Choose a certain fraction of examples to be subject to dropout. For those examples, choose one dropout operator at random from a distribution which may or may not be uniform over the reason groups.

Apply any of the dropout operators independently according to a binary probabilistic choice per operator, which may or may not be uniform across the reason groups. Probabilistic parameters may be chosen to ensure that there is a reasonable probability that no dropout operator will be applied to the given example.

Apply a number of distinct dropout operators to some of the training examples, where the maximum number of dropout operators applied to any single example is limited to the intended number of desired explanations which will be produced at explanation time, and other examples have no dropout operator applied to them.

Choose the distribution of dropout operators to apply (for those examples chosen to have any dropout applied) according to the Shapley sampling distribution, identifying selection of an unused feature, with the application of the corresponding dropout operator dropping out a reason group.

At evaluation time, after the model is trained, quantitative explanation statistics for one or more reason group are obtained by the difference in a model's score from the condition the reason group was included as an input minus the score when the reason group was dropped out. If the model's output is multivariate and not scalar, then an appropriate scalar distance metric is used between unperturbed and perturbed outputs, for example, cross-entropy in the case of multinomial categorical prediction. The concept of signed score difference may not be useful in this case.

In one embodiment, the simplest and most computationally efficient use of dropout for input attribution is to measure the difference between fully unperturbed and singly perturbed inputs, and use this statistic to rank the importance (e.g., larger is more important) and sign of contributions (e.g., positive means the inputs from the reason codes increase the score) from reason code k:

$$\iota_k(x) = M[x] - M[D_k[x]]$$

The above approach improves upon the unary QII approach with computational efficiency advantage (e.g., there will be no need for Monte Carlo sampling for estimating expectations) and reliability advantage (e.g., the model is not scored in a condition that it was not trained upon). The marginal contribution of reason code k, while other input groups are already dropped out may be defined by:

$$\iota_{k,S}(x) = M[D_S[x]] - M[D_{k \cup S}[x]]$$

Notation $D_S[x]$ means to drop out all inputs with reason codes in set S, which should not include reason code k. Heuristically this is computing the marginal importance of feature k under the condition that some features have already been removed. This dropout-based marginal influence statistic replaces the use of expectations or randomization perturbations in QII.

In one or more embodiments, at least one of the following approaches may be implemented for the use of statistics for interpretation, in order of increasing computational cost:

Independent unary: Compute $\iota_k(x)$ for a reason group and sort the reason groups from largest (e.g., most important) to smallest (e.g., least important).

Stepwise: Compute $\iota_k(x)$ for a reason group, find the maximum value and identify the reason group as the most important. Next, apply dropout operators which incrementally add on one additional distinct reason group, $\iota_{k,S}$ with S the previously identified reason group and find the maximum value of this statistic, indicating the second most important reason group. Continue stepwise adding additional distinct reason groups to previously identified top reasons until enough key explanations have been found.

K-tuple: For the explanation of the K most important reason groups (K<<|R| typically), generate all combinations of K distinct reason groups and measure the marginal importance of dropping all of them out at once, with the largest such statistic indicating the top K reasons. Optionally, this tuple may be sorted by unary or stepwise computations.

Additive allocation: compute marginal importance statistics $\iota_{k,S}(x)$ in distributions according to the Shapely, KernelSHAP, or other combinatorial distribution required by the additive computation of the user's choice.

The distribution of dropout operators used in the training procedure should match their use at scoring time for interpretation, plus substantial additional training examples left untouched for model scoring performance.

Figure 3:
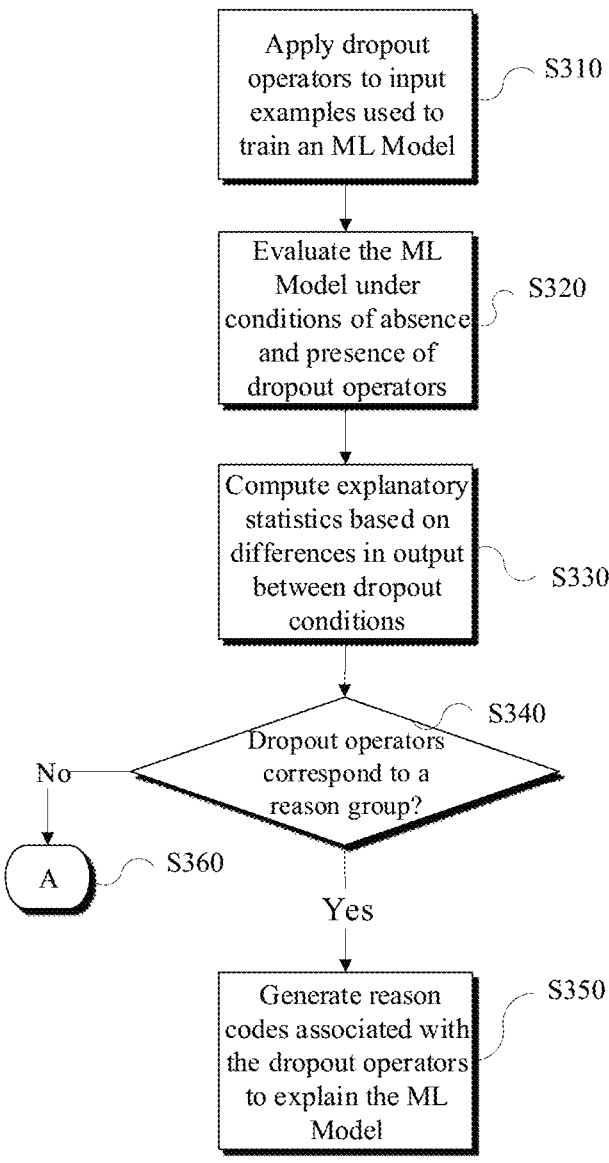
FIG. 3 is a flow diagram of a method for training a machine learning model by applying one or more dropout operators under selected conditions as set forth in further detail herein and below.

Referring to FIG. 3, the training of a machine learning model in accordance with one or more implementations disclosed above may be accomplished by applying dropout operators to input examples used to train the machine learning model (S310). The model may be evaluated under conditions of absence and presence of dropout operators (S320). Explanatory statistics may be computed for the model based on differences in model output between dropout conditions (S330). In certain embodiments, the dropout operators are associated with a set of inputs corresponding to a reason group.

If the dropout operators correspond to a reason group (S340), one or more reason codes may be generated (e.g., along with a score) to explain the model in association with the dropout operators (S350). Otherwise, the process may start over or generate an error message. In one or more aspects, the reason codes are associated with the dropout operators corresponding to the reason groups with the most influential explanatory statistics. In certain aspects, the unary explanatory dropout statistic given by $\iota_k(x)=M[x]-M[D_k[x]]$ and marginal explanatory dropout statistics given by $\iota_{k,S}(x)=M[D_S[x]]-M[D_{k\cup S}[x]]$ are combined to form an explanatory model, such as with the stepwise, K-tuple, Shapely or KernelSHAP attribution methods.

Figure 4:
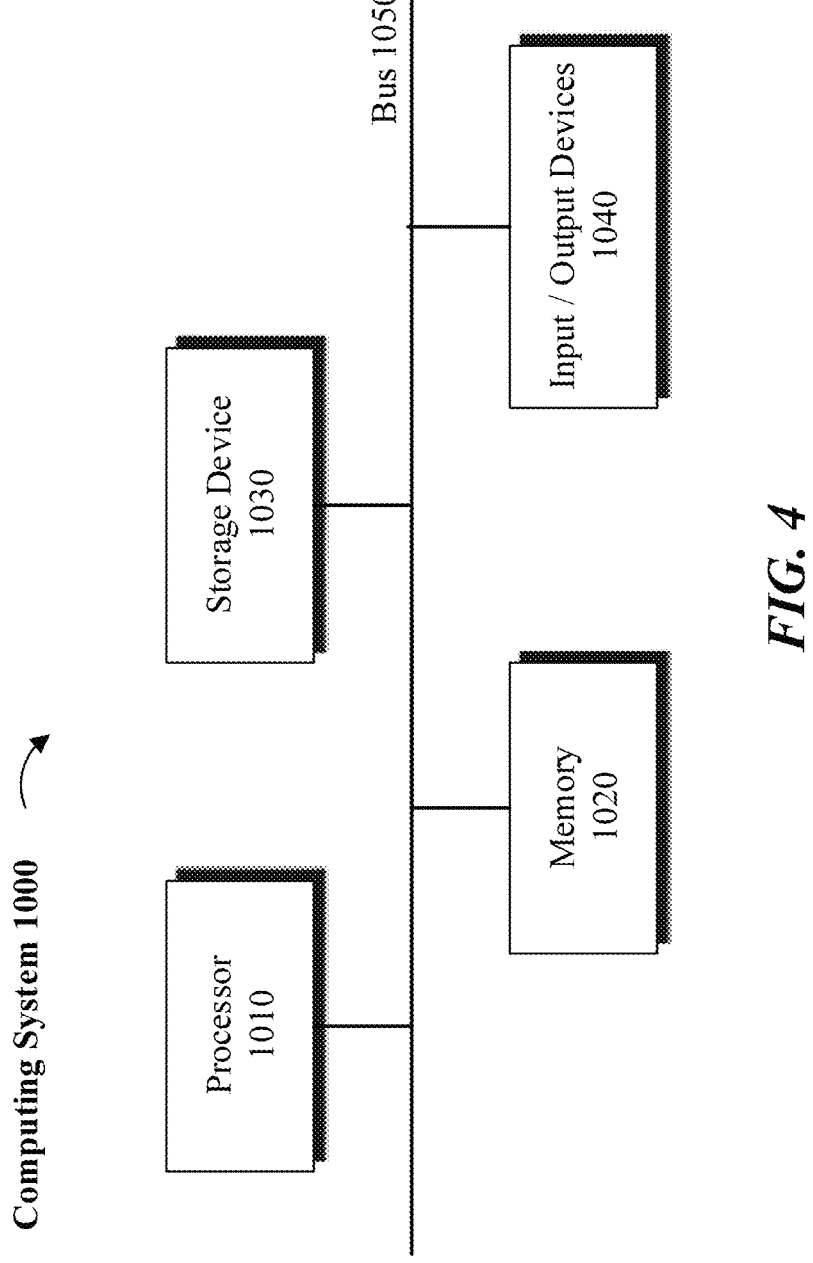
FIG. 4 is a block diagram of a computing system in accordance with one or more embodiments.

Referring to FIG. 4, a block diagram illustrating a computing system 1000 consistent with one or more embodiments is provided. The computing system 1000 may be used to implement or support one or more platforms, infrastructures or computing devices or computing components that may be utilized, in example embodiments, to instantiate, implement, execute or embody the methodologies disclosed herein in a computing environment using, for example, one or more processors or controllers, as provided below.

As shown in FIG. 4, the computing system 1000 can include a processor 1010, a memory 1020, a storage device 1030, and input/output devices 1040. The processor 1010, the memory 1020, the storage device 1030, and the input/output devices 1040 can be interconnected via a system bus 1050. The processor 1010 is capable of processing instructions for execution within the computing system 1000. Such executed instructions can implement one or more components of, for example, a cloud platform. In some implementations of the current subject matter, the processor 1010 can be a single-threaded processor. Alternately, the processor 1010 can be a multi-threaded processor. The processor 1010 is capable of processing instructions stored in the memory 1020 and/or on the storage device 1030 to display graphical information for a user interface provided via the input/output device 1040.

The memory 1020 is a computer readable medium such as volatile or non-volatile that stores information within the computing system 1000. The memory 1020 can store data structures representing configuration object databases, for example. The storage device 1030 is capable of providing persistent storage for the computing system 1000. The storage device 1030 can be a floppy disk device, a hard disk device, an optical disk device, or a tape device, or other suitable persistent storage means. The input/output device 1040 provides input/output operations for the computing system 1000. In some implementations of the current subject matter, the input/output device 1040 includes a keyboard and/or pointing device. In various implementations, the input/output device 1040 includes a display unit for displaying graphical user interfaces.

According to some implementations of the current subject matter, the input/output device 1040 can provide input/output operations for a network device. For example, the input/output device 1040 can include Ethernet ports or other networking ports to communicate with one or more wired and/or wireless networks (e.g., a local area network (LAN), a wide area network (WAN), the Internet).

In some implementations of the current subject matter, the computing system 1000 can be used to execute various interactive computer software applications that can be used for organization, analysis and/or storage of data in various (e.g., tabular) format (e.g., Microsoft Excel®, and/or any other type of software). Alternatively, the computing system 1000 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 1040. The user interface can be generated and presented to a user by the computing system 1000 (e.g., on a computer screen monitor, etc.).

One or more aspects or features of the subject matter disclosed or claimed herein may be realized in digital electronic circuitry, integrated circuitry, specially designed application specific integrated circuits (ASICs), field programmable gate arrays (FPGAs) computer hardware, firmware, software, and/or combinations thereof. These various aspects or features may include implementation in one or more computer programs that may be executable and/or interpretable on a programmable system including at least one programmable processor, which may be special or general purpose, coupled to receive data and instructions from, and to transmit data and instructions to, a storage system, at least one input device, and at least one output device. The programmable system or computing system may include clients and servers. A client and server may be remote from each other and may interact through a communication network. The relationship of client and server arises by virtue of computer programs running on the respective computers and having a client-server relationship to each other.

These computer programs, which may also be referred to as programs, software, software applications, applications, components, or code, may include machine instructions for a programmable controller, processor, microprocessor or other computing or computerized architecture, and may be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium may store such machine instructions non-transitorily, such as for example as would a non-transient solid-state memory or a magnetic hard drive or any equivalent storage medium. The machine-readable medium may alternatively or additionally store such machine instructions in a transient manner, such as for example as would a processor cache or other random access memory associated with one or more physical processor cores.

To provide for interaction with a user, one or more aspects or features of the subject matter described herein may be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices may be used to provide for interaction with a user as well. For example, feedback provided to the user may be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive trackpads, voice recognition hardware and software, optical scanners, optical pointers, digital image capture devices and associated interpretation software, and the like.

Terminology

When a feature or element is herein referred to as being "on" another feature or element, it may be directly on the other feature or element or intervening features and/or elements may also be present. In contrast, when a feature or element is referred to as being "directly on" another feature or element, there may be no intervening features or elements present. It will also be understood that, when a feature or element is referred to as being "connected", "attached" or "coupled" to another feature or element, it may be directly connected, attached or coupled to the other feature or element or intervening features or elements may be present. In contrast, when a feature or element is referred to as being "directly connected", "directly attached" or "directly coupled" to another feature or element, there may be no intervening features or elements present.

Although described or shown with respect to one embodiment, the features and elements so described or shown may apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments and implementations only and is not intended to be limiting. For example, as used herein, the singular forms "a", "an" and "the" may be intended to include the plural forms as well, unless the context clearly indicates otherwise. It will be further understood that the terms "comprises" and/or "comprising," when used in this specification, specify the presence of stated features, steps, operations, processes, functions, elements, and/or components, but do not preclude the presence or addition of one or more other features, steps, operations, processes, functions, elements, components, and/or groups thereof. As used herein, the term "and/or" includes any and all combinations of one or more of the associated listed items and may be abbreviated as "/".

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

Spatially relative terms, such as "forward", "rearward", "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features due to the inverted state. Thus, the term "under" may encompass both an orientation of over and under, depending on the point of reference or orientation. The device may be otherwise oriented (rotated 90 degrees or at other orientations) and the spatially relative descriptors used herein interpreted accordingly. Similarly, the terms "upwardly", "downwardly", "vertical", "horizontal" and the like may be used herein for the purpose of explanation only unless specifically indicated otherwise.

Although the terms "first" and "second" may be used herein to describe various features/elements (including steps or processes), these features/elements should not be limited by these terms as an indication of the order of the features/ elements or whether one is primary or more important than the other, unless the context indicates otherwise. These terms may be used to distinguish one feature/element from another feature/element. Thus, a first feature/element discussed could be termed a second feature/element, and similarly, a second feature/element discussed below could be termed a first feature/element without departing from the teachings provided herein.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise.

For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, may represent endpoints or starting points, and ranges for any combination of the data points. For example, if a particular data point "10" and a particular data point "15" may be disclosed, it is understood that greater than, greater than or equal to, less than, less than or equal to, and equal to 10 and 15 may be considered disclosed as well as between 10 and 15. It is also understood that each unit between two particular units may be also disclosed. For example, if 10 and 15 may be disclosed, then 11, 12, 13, and 14 may be also disclosed.

Although various illustrative embodiments have been disclosed, any of a number of changes may be made to various embodiments without departing from the teachings herein. For example, the order in which various described method steps are performed may be changed or reconfigured in different or alternative embodiments, and in other embodiments one or more method steps may be skipped altogether. Optional or desirable features of various device and system embodiments may be included in some embodiments and not in others. Therefore, the foregoing description is provided primarily for the purpose of example and should not be interpreted to limit the scope of the claims and specific embodiments or particular details or features disclosed.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal.

The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

The examples and illustrations included herein show, by way of illustration and not of limitation, specific embodiments in which the disclosed subject matter may be practiced. As mentioned, other embodiments may be utilized and derived therefrom, such that structural and logical substitutions and changes may be made without departing from the scope of this disclosure. Such embodiments of the disclosed subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve an intended, practical or disclosed purpose, whether explicitly stated or implied, may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The disclosed subject matter has been provided here with reference to one or more features or embodiments. Those skilled in the art will recognize and appreciate that, despite of the detailed nature of the example embodiments provided here, changes and modifications may be applied to said embodiments without limiting or departing from the generally intended scope. These and various other adaptations and combinations of the embodiments provided here are within the scope of the disclosed subject matter as defined by the disclosed elements and features and their full set of equivalents.

COPYRIGHT & TRADEMARK NOTICES

What is claimed is:

1. An explanatory dropout method stored as instructions in at least one non-transitory machine-readable medium, wherein the instructions are executed by one or more processors for improving a computer implemented machine learning model, the execution of the instructions by the one or more processors causing a computing machine to perform operations including:

processing a machine learning model, the machine learning model trained using a plurality of input examples provided to the machine learning model, by stochastically applying one or more dropout operators to one or more input examples, the training being based on conditions including an absence or a presence of the one or more dropout operators applied to the one or more input examples;

evaluating the machine learning model under the conditions of absence and presence of the one or more dropout operators applied to the one or more input examples;

computing explanatory statistics for the machine learning model based on the machine learning model's output generated under the conditions of absence and presence of one or more dropout operators applied to the one or more input examples, and generating one or more reason codes associated with the one or more dropout operators, wherein the one or more reason codes provide an explanation for how the machine learning model behaves when the one or more dropout operators are present or absent.

2. The method of claim 1, wherein at least one of the one or more dropout operators is associated with a set of inputs corresponding to a reason group, the set of inputs having similar explanation reasons.

3. The method of claim 1, wherein the machine learning model is evaluated at scoring time on a first input vector to generate a score.

4. The method of claim 3, wherein the one or more reason codes are generated along with the score.

5. The method of claim 4, wherein at least a first reason code from among the one or more reason codes corresponds to at least a first reason group.

6. The method of claim 5, wherein the first reason group is associated with a computation using the machine learning model's output observed in various dropout and non-dropout conditions.

7. The method of claim 5, wherein the first reason group is associated with a most influential explanatory statistic computed for the machine learning model based on the differences in the machine learning model's output between the dropout conditions, wherein the machine learning model has been trained on both dropout and non-dropout conditions.

8. The method of claim 1, wherein the one or more dropout operators perform an elementwise multiplicative function upon a first input vector.

9. The method of claim 2, wherein the one or more dropout operators are defined per reason group, an operator denoted by $D_k[\bullet]$, with k ranging over a set of reason groups, and $R_k$ denoting a set of input indices corresponding to reason group k:

$$D_k[x_j] = \begin{cases} \alpha_k \cdot x_j & \text{if } j \notin R_k \\ 0 & \text{if } j \in R_k \end{cases}$$

10. The method of claim 9, wherein value of ax is one of:

$\alpha_k = 1$, $\alpha_k = D/(D - |R_k|)$, with D overall number of input features and $|R_k|$ being the number of input features associated with a reason group k, $$\alpha_k = \frac{|R|}{|R| - 1}$$

for all $\alpha_k$, with $|R|$ being the total number of reason groups, or $\alpha_k$ is a free parameter to be optimized in the machine learning training process.

11. The method of claim 1, wherein the one or more dropout operators are chosen stochastically per example during training under a distribution according to at least one or more of the following approaches: choosing a certain fraction of examples to be subject to dropout, for a chosen example, choosing one dropout operator at random, from a distribution which may or may not be uniform over one or more reason groups; choosing whether to apply at least one of the dropout operators independently according to a binary probabilistic choice per operator, which may or may not be uniform across the reason groups, wherein probabilistic parameters are chosen to ensure that there is a reasonable probability that no dropout operator will be applied to the chosen example; choosing whether to apply no dropout or at least one of the dropout operators according to a procedure compatible with a stepwise explanatory procedure or a K-tuple explanatory procedure, choosing one or more distinct dropout operators to be applied to be a randomly selected value between zero and up to number of steps in the stepwise explanatory procedure or a cardinality of a K-tuple, and choosing identities of the one or more distinct dropout operators at random, from a distribution which may or may not be random over the reason groups; or choosing a set of dropout operators to apply or not to apply according to a Shapley sampling distribution.

12. The method of claim 3, wherein a unary explanatory dropout statistic is given by $\iota_k(x)=M[x]-M[D_k[x]]$, with $M[x]$ denoting a machine learning model score upon input vector x, and $D_k[x]$ denoting a dropout operator dropping out inputs with a reason group k, and wherein the machine learning model has been trained on both dropout and non-dropout conditions.

13. The method of claim 3, wherein a marginal explanatory dropout statistic is given by $\iota_{k,S}(x)=M[D_S[x]]-M[D_{k\cup S}[x]]$, with S a set of dropout operators not including dropout operator k, and wherein the machine learning model has been trained on both dropout and non-dropout conditions; defining a notation $D_Z[x]$ to represent a composite dropout operator executing all individual dropout operators contained in arbitrary set Z.

14. The method of claim 3, wherein a unary explanatory dropout statistic is given by $\iota_k(x)=M[x]-M[D_k[x]]$ and a marginal explanatory dropout statistic is given by $\iota_{k,S}(x)=M[D_S[x]]-M[D_{k\cup S}[x]]$.

15. The method of claim 14, the unary explanatory dropout statistic is used to form an explanatory result with a univariate attribution method.

16. The method of claim 15, the unary explanatory dropout statistic and the marginal explanatory dropout statistic are combined to form an explanatory result with univariate, stepwise, K-tuple, Shapely, or KernelSHAP attribution methods.

17. An improved computer implemented machine learning system having one or more processors configured for executing instructions to perform operations comprising:
processing a machine learning model, the machine learning model trained using a plurality of input examples provided to the machine learning model, by stochastically applying one or more dropout operators to one or more input examples, the training being based on conditions including an absence or a presence of the one or more dropout operators applied to the one or more input examples;
evaluating the machine learning model under the conditions of absence and presence of the one or more dropout operators applied to the one or more input examples;
computing explanatory statistics for the machine learning model based on the machine learning model's output generated under the conditions of absence and presence of one or more dropout operators applied to the one or more input examples, and
generating one or more reason codes associated with the one or more dropout operators, wherein the one or more reason codes provide an explanation for how the machine learning model behaves when the one or more dropout operators are present or absent.

18. The system of claim 17, wherein at least one of the one or more dropout operators is associated with a set of inputs corresponding to a reason group, the set of inputs having similar explanation reasons.

19. The system of claim 17, wherein the machine learning model is evaluated at scoring time on a first input vector to generate a score.

20. A computer program product comprising a non-transitory machine-readable medium storing instructions that, when executed by at least one programmable processor, cause the at least one programmable processor to perform operations comprising:
processing a machine learning model, the machine learning model trained using a plurality of input examples provided to the machine learning model, by stochastically applying one or more dropout operators to one or more input examples, the training being based on conditions including an absence or a presence of the one or more dropout operators applied to the one or more input examples;
evaluating the machine learning model under the conditions of absence and presence of the one or more dropout operators applied to the one or more input examples;
computing explanatory statistics for the machine learning model based on the machine learning model's output generated under the conditions of absence and presence of one or more dropout operators applied to the one or more input examples, and
generating one or more reason codes associated with the one or more dropout operators, wherein the one or more reason codes provide an explanation for how the machine learning model behaves when the one or more dropout operators are present or absent.

* * * * *